(No Model.)　　　　　　　　　　　　　　2 Sheets—Sheet 2.
S. L. NORRIS.
CAR STARTER AND BRAKE.
No. 348,169.　　　　　　　　　Patented Aug. 24, 1886.
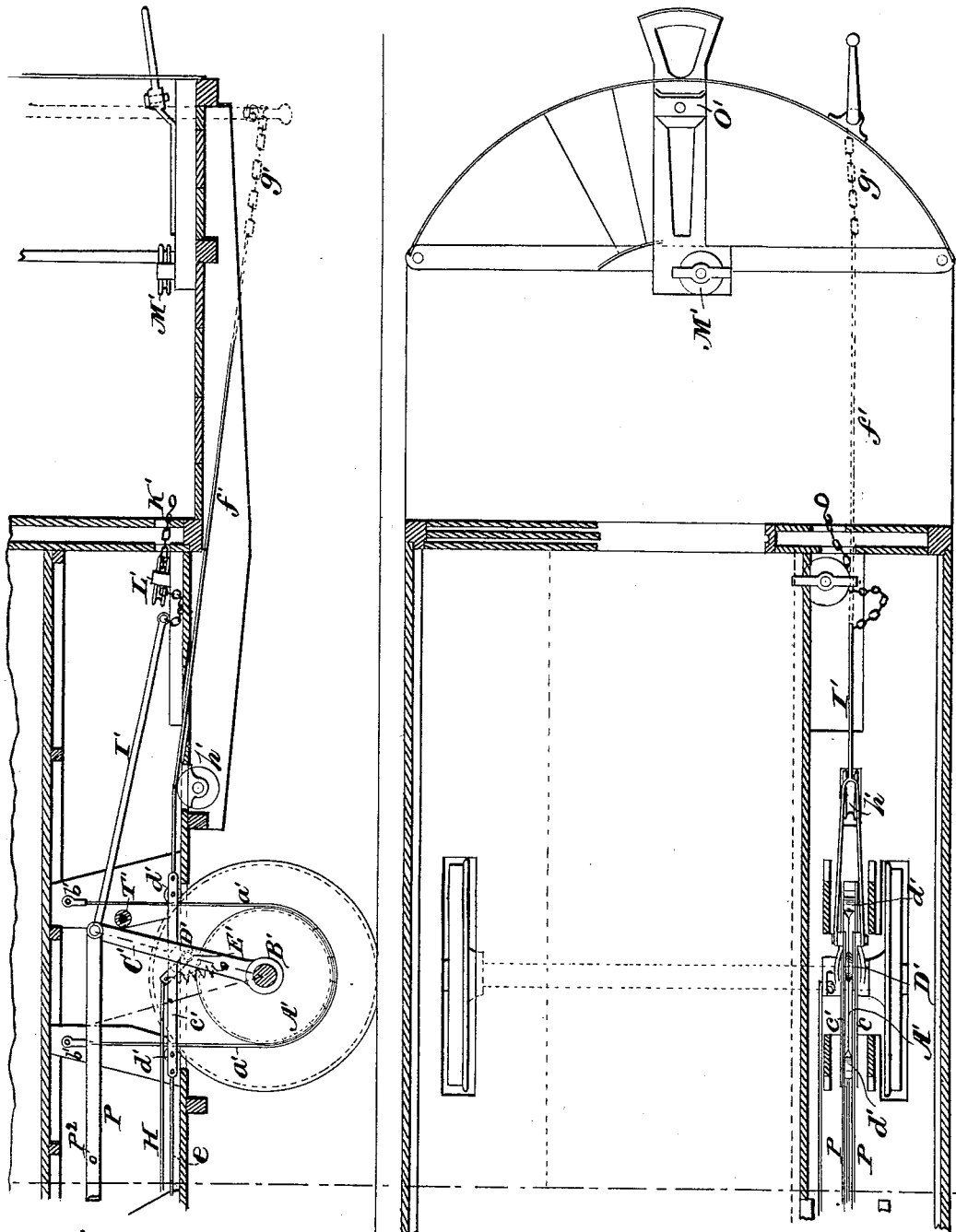
Witnesses.
Robert Ewatt,
Vinton Domic
Inventor:
Stephen L. Norris.
By James L. Norris.
Atty.

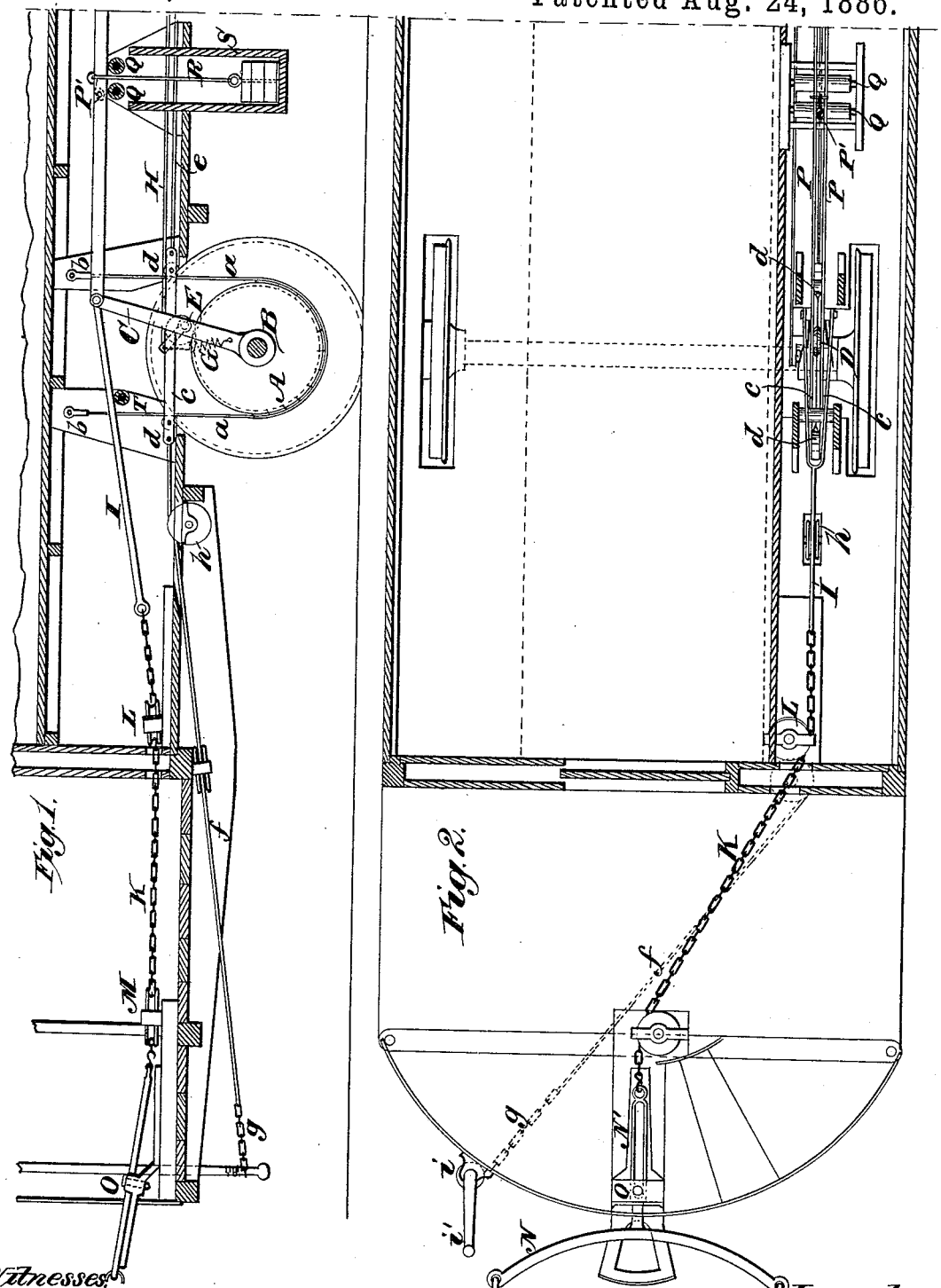

UNITED STATES PATENT OFFICE.

STEPHEN L. NORRIS, OF PORTSMOUTH, COUNTY OF HANTS, ENGLAND.

CAR STARTER AND BRAKE.

SPECIFICATION forming part of Letters Patent No. 348,169, dated August 24, 1886.

Application filed May 12, 1886. Serial No. 202,013. (No model.) Patented in England June 1, 1885, No. 6,632.

*To all whom it may concern:*

Be it known that I, STEPHEN LESLIE NORRIS, a citizen of England, residing at Portsmouth, in the county of Hants, England, have invented a new and useful Apparatus for Starting Tram-Cars and other Vehicles or Rolling-Stock and for Applying the Brakes thereto, (for which application for patent has been made in Great Britain June 1, 1885, No. 6,632,) of which the following is a specification.

My invention has for its object, first, to afford a horse or motor-engine drawing a tram-car or other vehicle an increased power of traction when starting a vehicle, in order to enable it to overcome the inertia thereof without undue strain. For this purpose I fix upon the axle of the running-wheels or upon the hub of the wheels, when these revolve upon a fixed axle, a disk or wheel on each side of which is a lever, loose upon the axle and free to turn through a small arc, the two levers being connected together by a bolt, beyond the circumference of the wheel. This bolt carries a "silent feed-cam"—that is to say, a cam so formed that when the levers are moved in one direction the cam will slide freely over the periphery of the wheel, but when moved in the opposite direction it will turn so as to bite upon the circumference of the wheel and cause this to move with the levers. The levers are extended beyond the point where they carry the cam to such a length as may be necessary for obtaining the desired increased power for turning the road-wheels. The practical result is that the available force is applied with a leverage of the radius of the bearing-wheel plus the length of the lever, instead of being applied indirectly with a leverage of the radius of bearing-wheel only. On stopping the vehicle, the driver, by means of a winch or other suitable mechanical power drawing back the motor, slackens the traces or coupling, and enables the trace-system draw-bar coupling, trace-rod, and coupling-rods to be drawn back the length of the slot in the draw-bar by some arrangement, such as a weight or coiled spring attached to the coupling-rods, and rising and falling with the motion of the levers from pulleys in the center of the car.

In applying this invention to tram-cars or railway-carriages when the motor is applied alternately to each end for propelling the car in either direction, the silent feed-cams are so arranged that by reversing their position they can be made to bite on the starting-wheels when the levers are moved in either direction. The cam-handle may be fitted with a spring, attached near the foot of the lever, and so adjusted in tension that the bite of the cam is assured, and its being thrown over on release from the wheel prevented, and the two handles are also connected by a special coupling-rod, enabling them to be reversed when necessary, and possibly, by their weight, dispensing with the use of the spring aforesaid. The coupling-rod is acted on from either end of the car by straps passing over the central pulleys and carried out to convenient positions near the driver's seat. By these the cams can be reversed. Stops are suitably placed at each end of the lever's arc to make the whole advantage of the gear automatically available in the event of the car, when heavily loaded on a slope, overcoming the action of the brakes. I also combine with the above-described starting mechanism brake-gear, consisting of band-brakes passing round the before-described starting disks or wheels, and actuated by being deflected by means of a horizontal bar so arranged that the brakes are applied when the bar is moved in either direction, but are out of action when the bar is in the middle position, as will hereinafter be described.

The accompanying drawings show an application of my above-described invention to a tram-car.

Figure 1 shows a longitudinal section of the tram-car, and Fig. 2 shows a sectional plan.

A A' are grooved disks or wheels fixed on the axles B B'.

C C' are forked levers embracing the disks A A', and mounted loose on the axles. Within the forks of the levers are mounted eccentrics or cams D D', rotatable on pins E E' carried by the levers, and fitting, by preference, with a V-shaped periphery in a corresponding V groove of the disks A A', the eccentricity being such that so soon as the levers are moved to the left hand from the position indicated the eccentrics will at once bite in the grooves of the disks and cause these to be carried round with the lever. The eccentrics are also so formed and arranged that their position can be reversed relatively to the levers C C', so that when these have been moved over into the positions indicated by the dotted lines on starting the car in the direction of the arrow, and are now required to operate in the contrary direction for starting the car when it is traveling toward the right hand, the eccentrics can be turned over into the opposite position to that shown, so as to bite on the disks A A' when the levers are moved over to the right.

For reversing the position of the eccentrics and holding them in the position into which they are moved, the axes on which they are fixed carry small levers F F', the ends of which are connected to the levers C C' by helical springs G G', and they are also connected to each other by a rod, H, so that when the one eccentric is reversed by means of its lever the other one will be simultaneously reversed by means of the rod, and they will both be held in that position by means of their springs. The levers C C', which extend to such a length as may be found necessary to afford the requisite amount of leverage, have their upper ends connected to rods I I', which in their turn are connected to chains K K', passing over guide-pulleys L L' and M M', and hooked to the draft-iron N. This is formed with a slot, N', by means of which it can slide to and fro to a certain extent upon the linchpin O, by which it is secured temporarily to the car. The two levers, C C', are connected together by means of rods P, so that the movement of the one lever is communicated to the other one.

The action of the above-described apparatus will be as follows: Assuming the draft-iron N to be in the backward position shown, then on a pull being exerted upon them by the horses or other motor, they will, by means of the chain K and rod I, pull over the levers C C' from the position shown in full lines into that indicated by the dotted lines, and as during this motion the eccentrics D D' will bite on the disks A A' so as to carry these round with the levers, the axles B B' and road-wheels will be rotated to a corresponding extent, and the tram-car will be started. When the levers have arrived in the dotted position, the draft-iron will have been drawn outward until the inner end of the slot N' bears against the linchpin, whereupon the motor will exert a direct pull on the car in the usual manner. The connecting-bars P are provided with two pins, P' P², so arranged that when the levers and bars are in the position shown in the drawings the pin P' is situated near the space between two fixed guide-pulleys, Q Q', while when the levers and bars have been moved over into the other position the pin P² is situated in that position. By means of a hook or catch a cord or chain, R, having weights attached thereto inside a box, S, and passing up between the pulleys Q Q', is attached to the bars P at one or other of the pins, according to the position of the levers, so that when, for instance, it is attached at P', and the levers are drawn over into the dotted position, the cord or chain with its weights will be drawn upward over the pulley Q. So long as a pull is exerted upon the draft-iron by the motor the weighted cord or chain will be held in the raised position; but when such pull ceases, on stopping, and the driver then causes the motor to move backward toward the tram-car, so as to slack the chain K, the pull exerted by the raised weights upon the bars P will cause the levers C C' to be moved back into their original position, such motion being limited by the levers C C' coming against the stop T. The apparatus will now be in position to operate again in the above-described manner on the car being again started. When the car has to travel in the opposite direction, the levers C C' are moved over into the dotted position, the position of the eccentrics D D' having in the first instance been reversed by means of the levers F or F'. The weighted cord or chain R is then disconnected from the pin P' and connected to the pin P², which will now be situated near the guide-pulleys Q Q', and the starting apparatus will then be ready to operate in the above-described manner on a pull being exerted on the chain K', to which the draft-irons will have been attached. It will be seen that when the levers C C' are moved backward, as above described, or when, after they have been moved forward for starting the vehicle, the disks continue to revolve with the road-wheels while the levers remain stationary, the motion of the disks A A' relative to the position of the eccentrics D D' will be such that these will cease to bite on the disks and will only remain loosely in contact therewith.

With tram-cars of present construction with side seats the starting apparatus must necessarily be arranged on one side, as shown, in order to find room under one of the seats; but in new tram-cars the seats might be arranged centrally back to back, in order to allow of the starting-gear being arranged centrally.

For combining break-gear with the above-described starting-gear, metal bands $a$ $a'$ are passed round the under side of the disks A A', and have their ends attached to strong pins $b$ $b'$ on the framing, the bands being made to hang with a certain amount of slack round the disks.

The rods I I' of the before-described starting apparatus are forked, as shown in plan, to allow of the passage of one part of the brake-band, the other part of which passes between the double bars P. The brake-straps also pass between double bars $c$ $c'$, having between them rollers $d$ $d$ $d'$ $d'$, bearing against the outer surface of each part of the brake-band. The two double bars $c$ $c'$ are connected together by a rod, $e$, passing through slots in the weight-box S, and have their other ends connected by cords $f$ $f'$ to chains $g$ $g'$, that are led over guide-pulleys $h$ $h'$ to an upright winch, $i$, rotatable by a crank-handle, $i'$. From this arrangement it will be seen that if, when the driver is situated, say, at the left-hand end of the car, it is desired to apply the brakes, then on his rotating the winch $i$ and thus winding up the chain $g$, this will draw the bars $c\ c'$ toward the left hand, causing the right-hand rollers, $d$ and $d'$, to deflect the right-hand side of the brake-bands $a\ a'$ laterally, and in thus drawing them tight round the disks A A' cause the brakes to be applied. On again releasing the winch (which is held by a pawl and ratchet that can be disengaged by a treadle) the elasticity of the deflected brake-bands will draw the bars $c\ c'$ back into their original position. The brake-bands may be provided with a lining of wood or other material, as indicated, instead of coming directly in contact with the disks A. It will be seen that the brake-band is deflected on that side on which the disk travels toward the deflection. It might be arranged to be deflected on the other side instead, by placing the rollers inside the band instead of outside; but I prefer the above arrangement, because by it the motion of the disk assists the tightening of the band instead of being opposed to it. It might also be deflected simultaneously on both sides by providing rollers both on the inside and the outside thereof.

With reference to the starting-gear, I would observe that instead of causing the levers C C', in operating, to start from one inclined position and to move over into the opposite inclined position, as described, they may be arranged to stand in a central vertical position when not in action, and to be moved over to the right hand or to the left hand from that position for starting either to the right or to the left. In this case the connection of the weighted cord R would not require shifting on reversal of the direction of motion.

Having thus described the nature of my invention, and the best means I know of for carrying the same into practical effect, I wish it to be understood that I am aware starting-gear has already been employed wherein a starting-lever carrying a pawl has been made to impart motion through a ratchet-wheel to the road-wheels, and I therefore do not claim such an arrangement; but

What I claim is—

1. The combination, with a car having the ordinary flanged wheels, of disks mounted rigidly on the wheel-axles and provided with V-shaped channels in the peripheries of said disks, levers C, fulcrumed on the axles, cams or eccentrics mounted on said levers and having their edges traveling in the grooves of the disks, arms connected to the cams and springs connecting such arms with the levers C, the latter being connected to the draft-irons of the car, substantially as described.

2. The combination, with the grooved disks A, of the levers C, the cams or eccentrics D, traveling in said grooves and mounted on the said levers C, the arms F, springs G, the connecting-bar P, having pins $P'\ P^2$, the rolls Q, and weighted cord R, substantially as described.

3. Brake apparatus consisting of a metal band partly surrounding a brake-drum, and having its two ends fixed to points at some distance from the brake-drum, in combination with a bar arranged transversely to the brake-band, and having two or more rollers or studs which, on moving the bar longitudinally, are made to deflect the brake-band laterally and thus cause it to grip the drum, substantially as herein described.

4. The combination of starting-gear for vehicles, consisting of a lever with cam or eccentric, that is made to bite on a disk or drum on the road axles or wheels when the lever is moved in the direction of starting, and a brake-band passing partly round the said disk or drum and having its ends fixed to points at some distance from the drum, which brake-strap is deflected laterally by the pressure of a roller or stud on the sliding bar, so as to cause it to bite on the disk or drum, substantially as described.

5. In starting-gear for vehicles, the combination of the disk A, lever C, rod P, weighted cord R, guide-pulley Q, eccentric or cam D, capable of being reversed so as to operate when the lever is moved in either direction, rod I, chain K, slotted draft-iron N, and linchpin O, arranged and operating substantially as herein described.

6. In starting-gear for vehicles, such as tram-cars that travel in both directions, the combination of the disks A A' on the axles of the two sets of road-wheels, levers C C', connected by rods P, having weighted cord or chain R, guide-pulleys Q Q', cams or eccentrics D D', connected by levers F F', and rod H, rods I I', chains K K', slotted draft-iron N, and linchpin O, arranged and operating substantially as herein described, for actuating the starting-gear when the horse or other motor is attached to either end of the vehicle.

7. In combined starting and braking gear for vehicles, a disk or drum, A, fixed on the axle of the road-wheels, a lever, C, mounted loose on said axles, with a cam or eccentric, D, so that on exerting a pull on the lever the cam or eccentric is made to bite on the disk and carry it round with it, a brake-band, $a$, passing round the disk A, and having its ends fixed to points at some distance therefrom, and a sliding bar, $c$, with rollers or studs $d\ d$, for deflecting the band laterally, so as to apply the brakes, substantially as described.

In testimony whereof I have signed my name to this specification, in the presence of two subscribing witnesses, this 28th day of April, A. D. 1886.

STEPHEN L. NORRIS.

Witnesses:
R. LEIGH,
    *Portsmouth*,
FANNY G. TOWERS,
    4 *Grand Parade, Portsmouth.*